US010628164B1

(12) United States Patent
Kothari et al.

(10) Patent No.: US 10,628,164 B1
(45) Date of Patent: Apr. 21, 2020

(54) BRANCH RESOLVE POINTER OPTIMIZATION

(71) Applicant: Apple Inc., Cupertino, CA (US)

(72) Inventors: Kulin N. Kothari, Cupertino, CA (US); Mridul Agarwal, Sunnyvale, CA (US); Aditya Kesiraju, San Jose, CA (US); Deepankar Duggal, Sunnyvale, CA (US); Sean M. Reynolds, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 16/048,721

(22) Filed: Jul. 30, 2018

(51) Int. Cl.
*G06F 9/30* (2018.01)
*G06F 9/38* (2018.01)

(52) U.S. Cl.
CPC .......... *G06F 9/3844* (2013.01); *G06F 9/3806* (2013.01)

(58) Field of Classification Search
None
See application file for complete search history.

(56) References Cited

U.S. PATENT DOCUMENTS

| 5,621,896 A | 4/1997 | Burgess et al. |
| 5,682,492 A | 10/1997 | McFarland et al. |
| 5,751,983 A * | 5/1998 | Abramson ............ G06F 9/3834 712/216 |
| 5,887,152 A | 3/1999 | Tran |
| 6,065,103 A * | 5/2000 | Tran ...................... G06F 9/3834 711/117 |
| 7,188,232 B1 * | 3/2007 | Choquette ........... G06F 9/30043 712/218 |
| 8,918,625 B1 * | 12/2014 | O'Bleness ............ G06F 9/3834 712/214 |
| 9,442,735 B1 * | 9/2016 | Jamil .................... G06F 9/3826 |

* cited by examiner

*Primary Examiner* — Corey S Faherty
(74) *Attorney, Agent, or Firm* — Kowert Hood Munyon Rankin and Goetzel PC; Rory D. Rankin

(57) ABSTRACT

A system and method for efficiently handling speculative execution. A load store unit (LSU) of a processor stores a commit candidate pointer, which points to a given store instruction buffered in the store queue. The given store instruction is an oldest store instruction not currently permitted to commit to the data cache. The LSU receives a first pointer from the mapping unit, which points to an oldest instruction of non-dispatched branches and unresolved system instructions. The LSU receives a second pointer from the execution unit, which points to an oldest unresolved, issued branch instruction. When the LSU determines the commit candidate pointer is older than each of the first pointer and the second pointer, the commit candidate pointer is updated to point to an oldest store instruction younger than the given store instruction stored in the store queue. The given store instruction is permitted to commit to the data cache.

20 Claims, 7 Drawing Sheets

BRANCH RESOLVE POINTER OPTIMIZATION

BACKGROUND

Technical Field

Embodiments described herein relate to the field of computing systems and, more particularly, to efficiently handling speculative execution.

Description of the Related Art

Modern instruction schedulers in microprocessors select multiple dispatched instructions out of program order to enable more instruction level parallelism, which reduces instruction latencies and increases performance. Microprocessors additionally reduce instruction latencies by determining memory dependences such as when a load instruction, or a read operation, attempts to read a memory location with an address that matches an address of an older store instruction, or write operation, that is still in the microprocessor. For example, the microprocessor includes a store queue for buffering store instructions (write operations) while waiting for these instructions to be conveyed to a memory subsystem such as a data cache. Rather than wait for the write operation to complete and later read the data from the data cache, store-to-load forwarding is used to send the data corresponding to the store instruction to the load instruction.

In some examples, the above store-to-load forwarding technique is not performed when it is determined that the store instruction is part of a speculative path. In other examples, the above store-to-load forwarding technique is performed when it is determined that the store instruction is part of a speculative path, and thus, the speculative path grows with the load instruction and instructions younger than the load instruction. In either case, the data corresponding to the store instruction is not committed to the memory subsystem until it is determined that the store instruction is no longer within a speculative path.

To further increase performance and reduce instruction latencies, the microprocessor performs speculative execution by predicting events that may happen in upcoming pipeline stages. One example is predicting the direction (e.g., taken or not-taken) and sometimes the target address of control transfer instructions. Examples of control transfer instructions are conditional branch instructions, jump instructions, call instructions in subroutine prologues and return instructions in subroutine epilogues.

The direction and the target address of the control transfer instruction is used to update the program counter (PC) register holding the address of the memory location storing the next one or more instructions of a computer program to fetch. During speculative execution, each of the direction and the target address are predicted in an early pipeline stage prior to the direction and the target address are resolved in a later pipeline stage. In the meantime, younger instructions, which are dependent on the control transfer instruction, are selected out-of-order for issue and execution. In some examples, a store instruction is one of the younger, dependent instructions being speculatively selected for issue and execution.

If the prediction of one or more of the direction and the target address are determined to be wrong in the later pipeline stage, then the instructions younger than the control transfer instruction are flushed from the pipeline stages, the correct direction and target address are used to update the PC, and instruction fetch and execution are restarted. Even if the predictions of the direction and the target address are determined to be correct in the later pipeline stage, the speculative store instruction waits for commit until an indication is received at the store queue specifying that the store instruction is no longer speculative. In addition to the processing of older control transfer instructions, the store instruction is considered speculative when older system instructions and other exceptions are not yet resolved.

In view of the above, efficient methods and mechanisms for efficiently handling speculative execution are desired.

SUMMARY

Systems and methods for efficiently handling speculative execution are contemplated. In various embodiments, a processor includes a store queue for storing outstanding store instructions. Control logic in the processor stores a commit candidate pointer, which points to a given store instruction buffered in the store queue. In some embodiments, the control logic is located in a load store unit in the processor. In some embodiments, the given store instruction is an oldest store instruction not currently permitted to commit to an external data cache. For example, the given store instruction is in a speculative path of one of a control transfer instruction, such as a conditional branch instruction, an unresolved system instruction and an exception being handled.

In an embodiment, the control logic receives a first pointer from an external mapping unit. The mapping unit performs register renaming and maps decoded instructions to physical registers. In some embodiments, the first pointer points to an oldest instruction of non-dispatched branches and unresolved system instructions. In an embodiment, the control logic receives a second pointer from an external execution unit. The execution unit executes decoded and issued integer instructions. In some embodiments, the second pointer points to an oldest unresolved issued branch instruction.

When the control logic determines the commit candidate pointer is older than each of the first pointer and the second pointer, the control logic updates the commit candidate pointer to point to an oldest store instruction younger than the given store instruction stored in the store queue. The given store instruction is determined to no longer be speculative and it is permitted to commit to the data cache. Since the execution unit sends the second pointer to the load store unit, rather than send it to the mapping unit located multiple prior pipeline stages away from the execution unit, to determine whether the given store instruction remains speculative, the latency for the determination is appreciably reduced. Additionally, there is no routing through multiple pipeline stages of any results from the mapping unit to the load store unit for further comparisons. Accordingly, the latency is further reduced.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
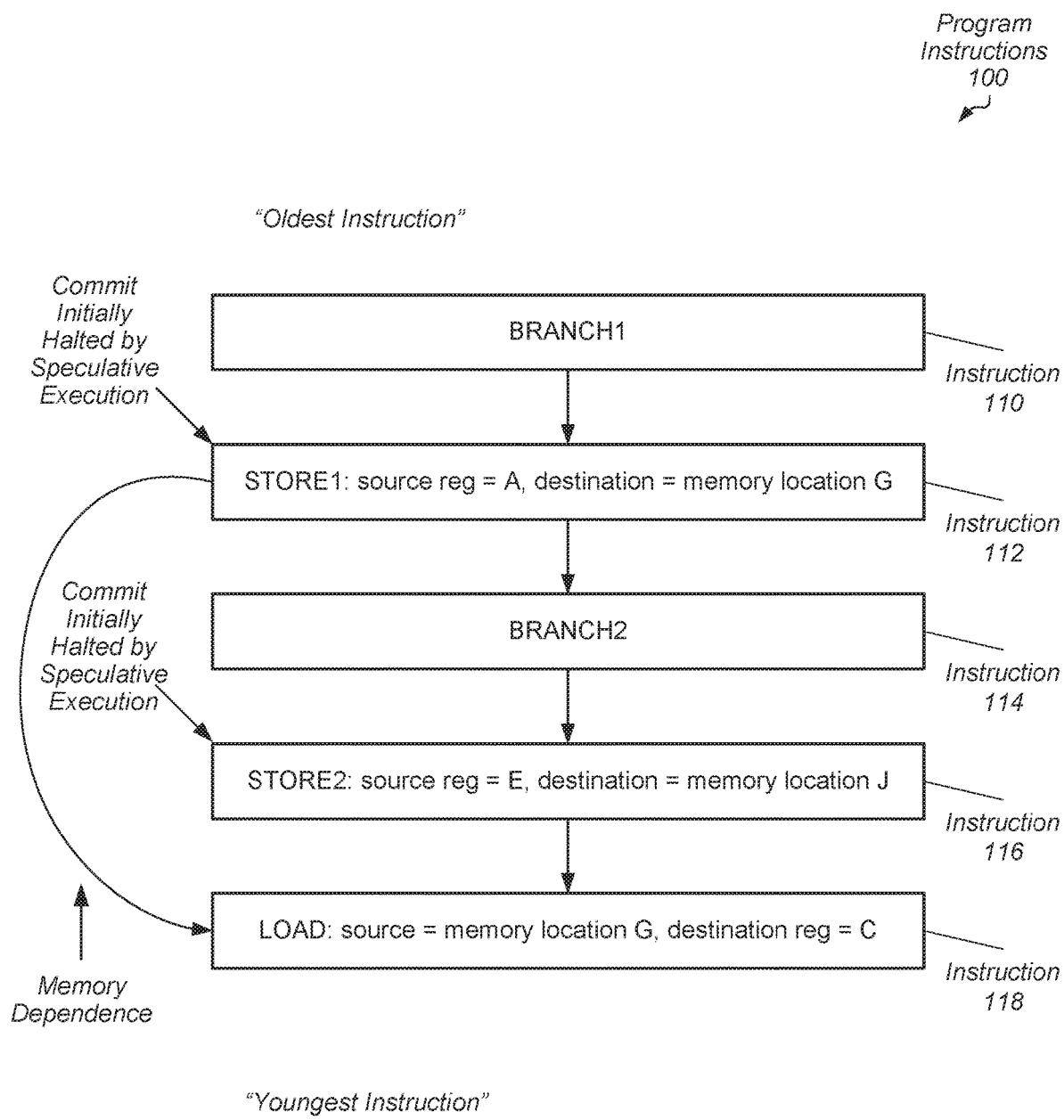
FIG. 1 is a block diagram of one embodiment of program instructions.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram of one embodiment of program instructions 100 is shown. FIG. 1 generally depicts instructions 110-118. The instructions 110-118 are meant to be a pseudocode example and language agnostic. In this example, general instruction mnemonics are used to indicate the control transfer instructions and the memory access instructions. Although only these two types of instructions are shown in the program sequence, in other embodiments, one or more other instruction types are included among instructions 110-118.

In the illustrated embodiment, the instruction mnemonic "BRANCH" is used for instructions 110 and 114. In various embodiments, this instruction mnemonic is used to indicate a control transfer instruction such as a conditional branch instruction. Other examples of control transfer instructions are direct jump instructions, indirect jump instructions, call instructions in subroutine prologues and return instructions in subroutine epilogues. Source operands, such as architectural registers and any displacement values, are not shown for ease of illustration.

In various embodiments, a processor includes one or more branch predictors in the front of the pipeline such as in an instruction fetch unit in the instruction fetch pipeline stage. The one or more branch predictors predict one or more of a direction and a target address of the control transfer instruction. Resolution of the direction and the target address occurs later in the pipeline such as in the execution pipeline stage. Therefore, instructions younger (in program order) than the control transfer instruction become speculative. Accordingly, if a fall through direction is predicted, then instructions 112, 116 and 118 become speculative.

In the illustrated embodiment, a source operand and a destination operand are listed after instruction mnemonics for instructions 112, 116 and 118. For example, the second and fourth instructions 112 and 116 write contents from an architectural register into a memory location pointed to by a memory address. The mnemonic "STORE" is used for instructions 112 and 116. The notation "source reg=" is used to indicate the source operand. The architectural register used as the source operand for instruction 112 is indicated as "A." The notation "destination=" is used to indicate the destination operand. The memory location used as the destination operand for instruction 112 is indicated as "G." Similar notations and indications are used for instructions 116 and 118.

As shown, instruction 112, which is the first Store instruction in program instructions 100, has a commit to a memory subsystem initially halted due to speculative execution. The speculative execution of instruction 112 is due to a predicted fall through path for the control transfer instruction with the mnemonic "BRANCH1" for instruction 110. In an embodiment, information corresponding to the memory access instruction 112 is buffered in an entry of a store queue. Even when the memory access instruction 112 speculatively completes, the data contents for the memory access instruction 112 are prevented from being sent to the memory subsystem such as a data cache, in an embodiment. The halt to commit continues until the control transfer instruction 110 is resolved and the fall through path is determined to be correct. At this point, the memory access instruction 112 is no longer speculative and the data contents are permitted to be sent to the memory subsystem.

In a similar manner to the above example, the memory access instruction 116 has a commit to the memory subsystem initially halted due to speculative execution. The speculative execution of memory access instruction 116 is due to a predicted fall through path for the control transfer instruction with the mnemonic "BRANCH2" for instruction 114. As shown, the read access instruction 118 with the mnemonic "LOAD" has a memory dependence on the write access instruction 112.

In some embodiments, the store-to-load forwarding technique is not performed between instructions 112 and 118 when it is determined that the memory access instruction 112 is part of a speculative path. In other examples, the store-to-load forwarding technique is performed when it is determined that the memory access instruction 112 is part of a speculative path, and thus, the speculative path grows with the read access instruction 118.

In this example, the read access instruction 118 is in a speculative path anyway due to the control transfer instruction 114. However, in other examples, when the read access instruction 118 is not initially within a speculative path, the store-to-load forwarding technique is not performed between instructions 112 and 118 in order to reduce the speculative path and the penalty associated with a misprediction for the control transfer instruction 110. In such a case, store-to-load forwarding technique is halted until it is determined that the write access instruction 112 is no longer speculative. In various embodiments, steps are taken to reduce the latency for determining when the write access instructions 112 and 116 are no longer speculative. Such steps are described in the following discussion.

Figure 2:
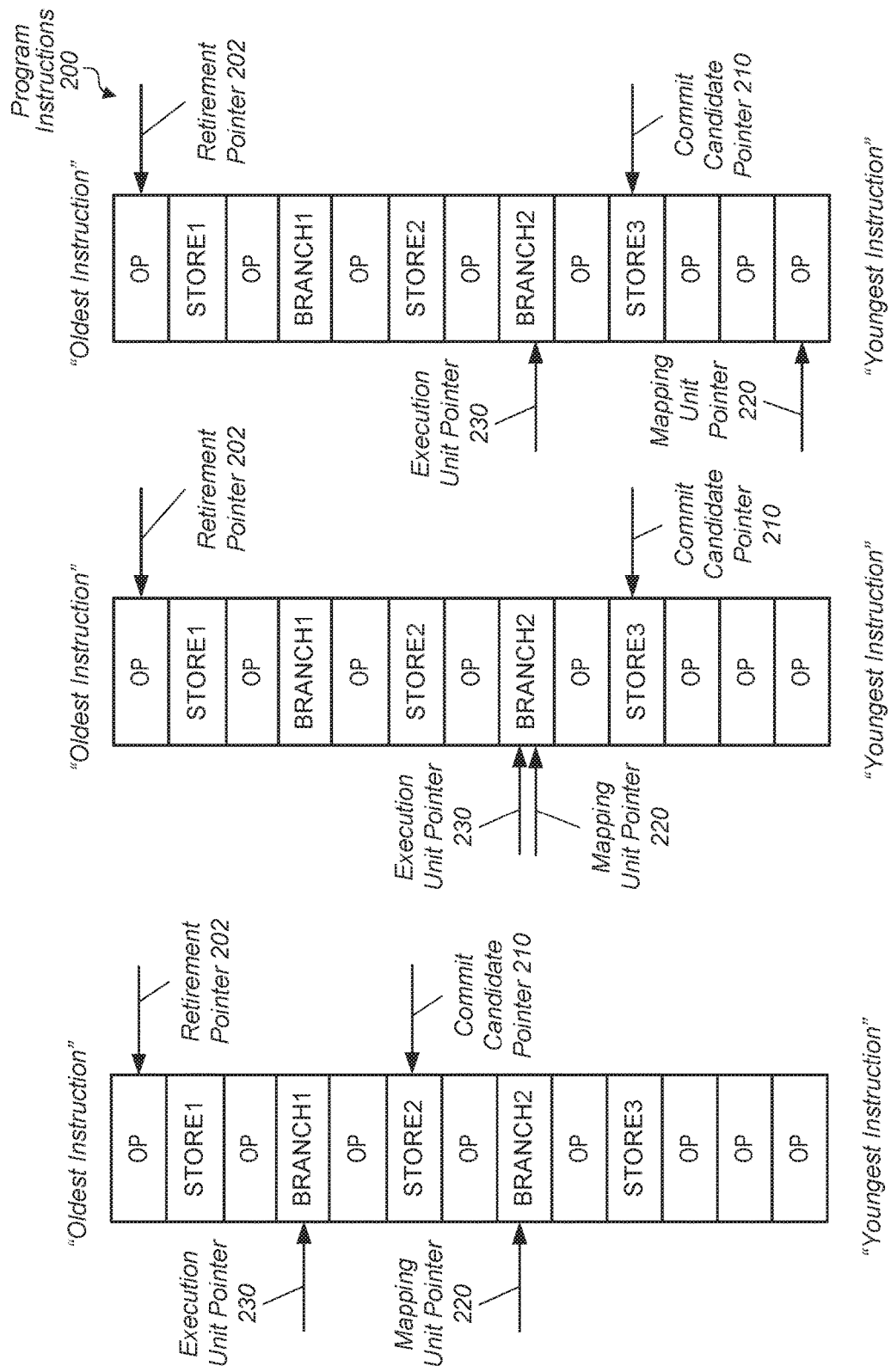
FIG. 2 is a block diagram of one embodiment of program instructions.

Turning to FIG. 2, a generalized block diagram of one embodiment of program instructions 200 is shown. FIG. 2 generally depicts instructions in program order at three different points in time such as points in time "t1," "t2," and "t3." The program instructions 200 are in various pipeline stages in a processor, which processes the program instructions 200. Again, general instruction mnemonics are used to indicate control transfer instructions, memory access instructions and other operations. For instructions that are not control transfer instructions or memory access instructions, the mnemonic "OP" is used.

In the illustrated embodiment, the write access instruction with the mnemonic "STORE1" (first instruction down from the oldest) follows an operation that is not a control transfer instruction. In contrast, the write access instruction with the mnemonic "STORE2" (fifth instruction down from the oldest) follows the control transfer instruction "BRANCH1." Therefore, each of the "OP" immediately following "BRANCH1" and "STORE2" are in the fall through speculative path of "BRANCH1." A similar scenario occurs for "BRANCH2" and "STORE3."

At the point in time (or time) t1, the retirement pointer 202 is pointing to the oldest non-retired instruction, which is the "OP" instruction at the top. In some embodiments, a reorder buffer or control logic in a completion unit maintains retirement pointer 202. The commit candidate pointer 210 points to an oldest outstanding store instruction not currently permitted to commit to the memory subsystem such as a data cache. In various embodiments, the load store unit (LSU) in a processor maintains commit candidate pointer 210 and each of the write access instructions has an entry allocated in a store queue in the LSU. At time t1, commit candidate pointer 210 points to the write access instruction "STORE2."

The mapping unit pointer 220 points to an oldest outstanding instruction of unresolved system instructions and non-dispatched control transfer instructions such as conditional branch instructions and indirect jump instructions. Examples of system instructions include kernel mode instructions run by the operating system to manage accesses to each of memory and input/output peripheral devices, and to assign tasks to processors. In an embodiment, the non-dispatched control transfer instructions remain stored in a dispatch unit in a dispatch pipeline stage prior to being stored in an issue unit in an issue pipeline stage. In various embodiments, the mapping unit in a processor maintains mapping unit pointer 220. At time t1, mapping unit pointer 220 points to the control transfer instruction "BRANCH2."

The execution unit pointer 230 points to an oldest outstanding instruction of unresolved issued control transfer instructions. In an embodiment, the unresolved issued control transfer instructions remain stored in an execution unit in an execution pipeline stage prior to having a resolution result sent to a reorder buffer and a branch predictor. In various embodiments, the execution unit in a processor maintains execution unit pointer 230. At time t1, execution unit pointer 230 points to the control transfer instruction "BRANCH1."

In some embodiments, each of the pointers 210, 220 and 230 is a group number or group identifier sent with information corresponding to a respective instruction throughout the processor pipeline. In an embodiment, each of pointers 210, 220 and 230 is used to identify a particular instruction of outstanding instructions in the processor pipeline. In an embodiment, each of the pointers 210, 220 and 230 also indicates program order age. For example, in one embodiment, pointers are assigned as group numbers in an ascending order to instructions in program order. In some embodiments, the group numbers are assigned in a contiguous ascending order. In either case, the smaller the group number, the older the instruction pointed to (or identified by) the pointer. Likewise, the larger the group number, the younger the instruction pointed to (or identified by) the pointer. Therefore, in one embodiment, the pointers 210-230 are used for comparisons to determine an older instruction between two instructions. In another embodiment, another field within the information corresponding to an instruction is sent throughout the processor pipeline which indicates program order age. Therefore, in an embodiment, the other field indicating program order age of an instruction is identified by a pointer of the pointers 210-230, and this field is used for comparisons to determine an older instruction between two instructions.

In various embodiments, control logic in the LSU receives each of the pointers 220 and 230. In some embodiments, control logic in the LSU compares each of the pointers 220 and 230 to commit candidate pointer 210. Alternatively, control logic in the LSU compares another field associated with the instructions pointed to by pointers 210, 220 and 230. In an embodiment, the control logic in the LSU first compares the pointers 220 and 230 to determine which pointer is a given pointer that points to an oldest instruction. Afterward, the control logic compares the given pointer to commit candidate pointer 210 to determine which pointer points to an oldest instruction.

At time t1, the control logic in the LSU determines commit candidate pointer 210 is not older than each of the pointers 220 and 230. For example, execution unit pointer 230 points to "BRANCH1," which is older than "STORE2" pointed to by commit candidate pointer 210. Accordingly, the control logic in the LSU maintains commit candidate pointer 210 with its current value, rather than updating commit candidate pointer 210. The write access instruction "STORE2" remains speculative.

In various embodiments, when the execution unit sends pointer 230 to the LSU, rather than send it to the mapping unit located multiple prior pipeline stages away from the execution unit, the latency for determining whether a given store instruction remains speculative is appreciably reduced. Additionally, there is no routing through multiple pipeline stages of any pointer comparison results from the mapping unit to the LSU for further comparisons. Accordingly, the latency is further reduced.

At time t2, execution unit pointer 230 is updated to point to "BRANCH2." For example, the execution unit resolved "BRANCH1," and the branch prediction was correct, so there is no flush of the processor pipeline. Control logic in the LSU again receives each of the pointers 220 and 230. The control logic in the LSU determines commit candidate pointer 210 is older than each of the pointers 220 and 230. For example, each of mapping unit pointer 220 and execution unit pointer 230 points to "BRANCH2," which is younger than "STORE2" pointed to by commit candidate pointer 210. The write access instruction "STORE2" is no longer speculative. Accordingly, the control logic in the LSU updates commit candidate pointer 210 to point to "STORE3," which is now the oldest store instruction not currently permitted to commit to the memory subsystem.

At time t3, mapping unit pointer 220 is updated to point to the youngest instruction "OP." For example, the mapping unit dispatched "BRANCH2" to the issue unit. Control logic in the LSU again receives each of the pointers 220 and 230. The control logic in the LSU determines commit candidate pointer 210 is not older than each of the pointers 220 and 230. For example, execution unit pointer 230 points to "BRANCH2," which is older than "STORE3" pointed to by commit candidate pointer 210. Accordingly, the control logic in the LSU maintains commit candidate pointer 210 with its current value, rather than updating commit candidate pointer 210. The write access instruction "STORE3" remains speculative.

Figure 3:
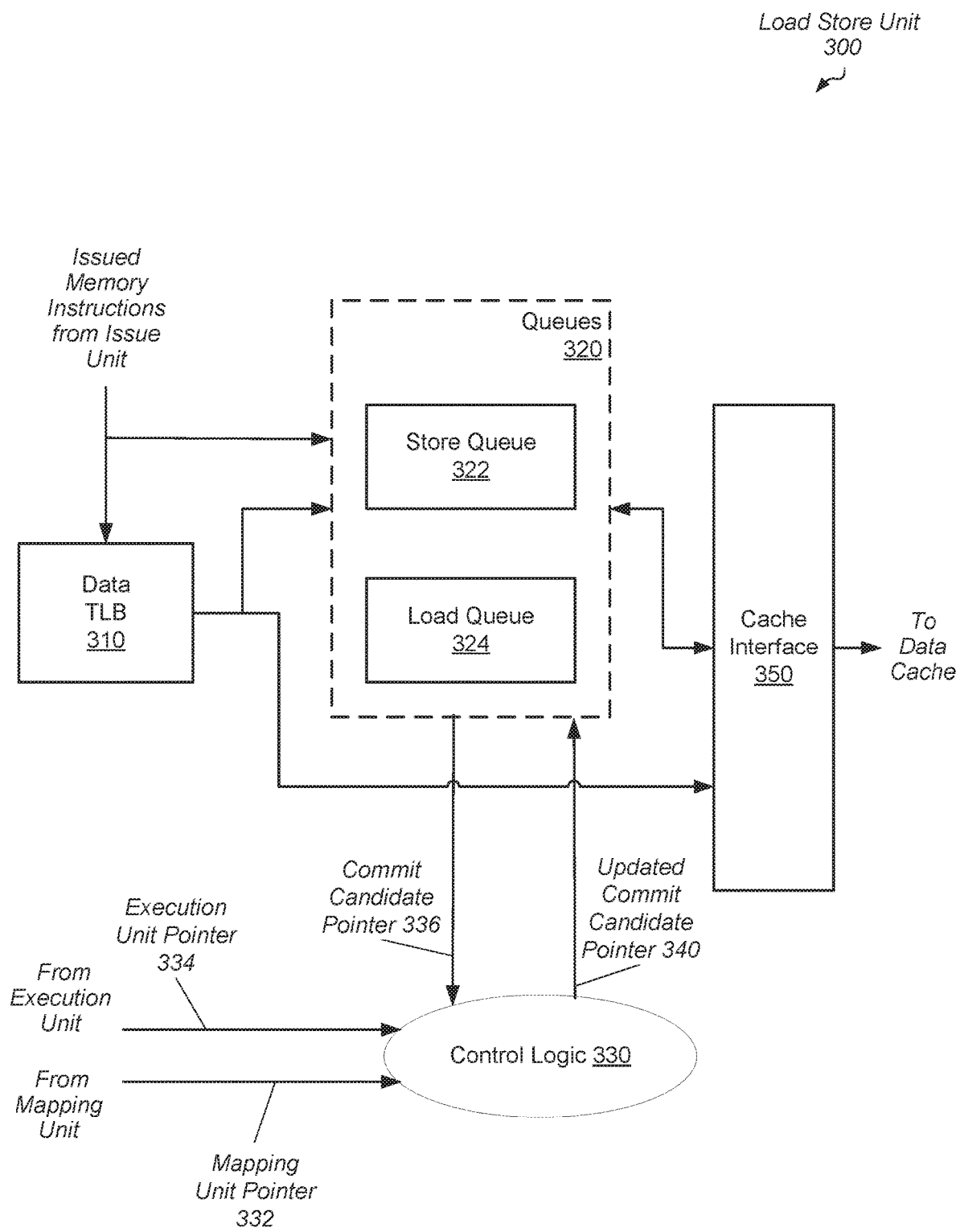
FIG. 3 is a block diagram of one embodiment of a load store unit.

Referring to FIG. 3, a generalized block diagram of one embodiment of a load store unit (LSU) 300 is shown. In the illustrated embodiment, LSU 300 includes a data translation lookaside buffer (DTLB) 310, queues 320 and control logic 330 and cache interface 350. Cache interface 350 supports any communication protocol with an external data cache. As used herein, a load instruction may be referred to as a read operation. Additionally, a store instruction may be referred to as a write operation. As shown, queues 320 includes store queue 322 and load queue 324 for storing issued but not-yet-committed store and load instructions for the purposes of coherency snooping and dependency checking for bypassing data. In an embodiment, store queue 322 stores addresses of not-yet-committed store instructions. In some embodiments, the data corresponding to these addresses are stored in a separate store buffer (not shown). In an embodiment, each of store queue 322, load queue 324 and a store buffer maintains information for in-flight store and load instructions.

In some embodiments, load instructions have corresponding data from an older store instruction bypassed to it from the store buffer (not shown), which stores the data prior to the data being written into the memory subsystem, such as a data cache, via cache interface 350. As load instructions enter LSU 300, a dependency check is performed for determining possible data bypass. In some embodiments, LSU 300 includes a miss buffer (not shown) for storing outstanding load and store instructions that cannot yet complete, for example due to cache misses.

In order to avoid the cost of performing a full memory translation when performing a cache access, LSU 300 stores a set of recent and/or frequently used virtual-to-physical address translations in the data translation lookaside buffer (DTLB) 310. DTLB 310 is implemented as a cache, as a content addressable memory (CAM), or using any other suitable circuit structure. During operation, DTLB 310 receives virtual address information and determine whether a valid translation is present. If so, DTLB 310 provides the corresponding physical address bits to one or more of queues 320 and cache interface 350. If not, DTLB 310 raises a virtual memory exception.

In various embodiments, control logic 330 includes a combination of circuitry and sequential elements for implementing at least pointer comparisons and updates. In an embodiment, control logic 330 is implemented as hardware circuitry. In another embodiment, control logic 330 is implemented as software. In other embodiments, control logic is implemented as a combination of hardware and software. In some embodiments, control logic 330 receives commit candidate pointer 336 from queues 320. In other embodiments, control logic 330 maintains commit candidate pointer 336. In an embodiment, commit candidate pointer 336 points to an oldest outstanding store instruction stored in an entry of store queue 322, which is not currently permitted to commit to the memory subsystem such as a data cache. For example, the store instruction pointed to by commit candidate pointer 336 is in a speculative path of one of a control transfer instruction, such as a conditional branch instruction or an indirect jump instruction, an unresolved system instruction, and an exception being handled.

In some embodiments, control logic 330 receives mapping unit pointer 332 from an external mapping unit. The mapping unit performs register renaming and maps decoded instructions to physical registers. In an embodiment, non-dispatched control transfer instructions remain stored in a dispatch unit in a dispatch pipeline stage prior to being stored in an issue unit in an issue pipeline stage. In various embodiments, mapping unit pointer 332 points to an oldest outstanding instruction of unresolved system instructions and non-dispatched control transfer instructions such as conditional branch instructions and indirect jump instructions.

In some embodiments, control logic 330 receives execution unit pointer 334 from an external execution unit. In an embodiment, the execution unit pointer 334 points to an oldest outstanding instruction of unresolved issued control transfer instructions. In an embodiment, the unresolved issued control transfer instructions remain stored in the execution unit in an execution pipeline stage prior to having a resolution result sent to a reorder buffer and a branch predictor. In various embodiments, when control logic 330 determines commit candidate pointer 336 is older than each of mapping unit pointer 332 and execution unit pointer 334, control logic 330 assigns updated commit candidate pointer 340 to point to an oldest store instruction younger than a given store instruction stored in the store queue 322, which is pointed to by commit candidate pointer 336. The given store instruction is determined to no longer be speculative and it is permitted to commit to the data cache via cache interface 350.

In some embodiments, when control logic 330 determines commit candidate pointer 336 is not older than each of mapping unit pointer 332 and execution unit pointer 334, control logic 330 assigns updated commit candidate pointer 340 to the current value of commit candidate pointer 336. In such a case, a given store instruction stored in the store queue 322, which is pointed to by commit candidate pointer 336, is determined to remain speculative and it is not permitted to commit to the data cache via cache interface 350.

Figure 4:
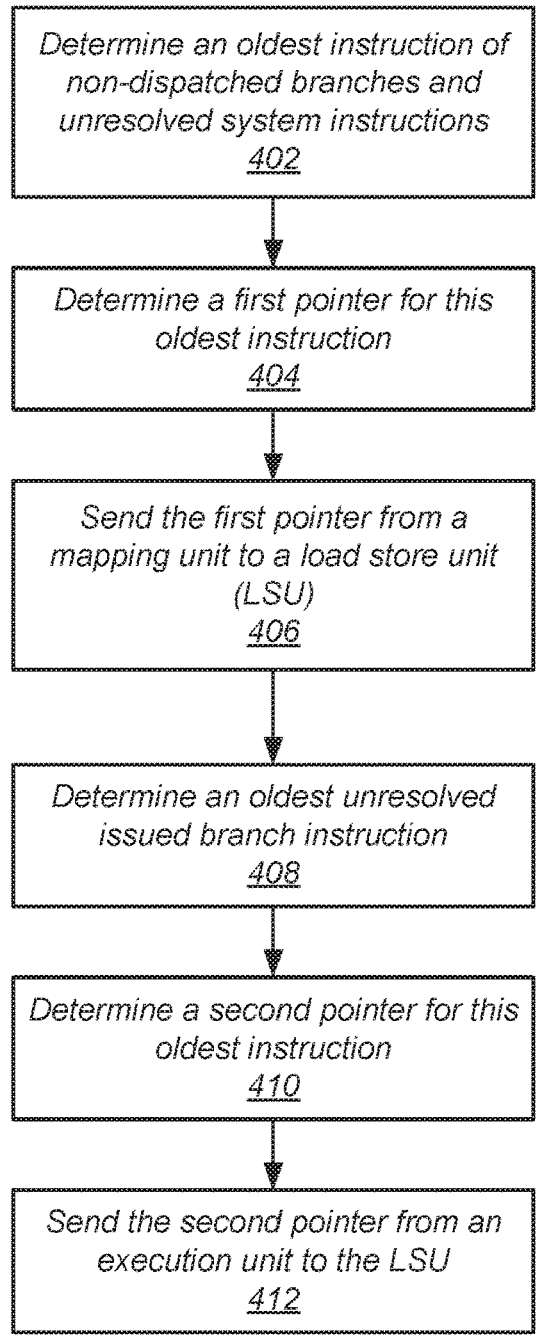
FIG. 4 is a flow diagram of one embodiment of a method for efficiently handling speculative execution.

Referring now to FIG. 4, a generalized flow diagram of one embodiment of a method 400 for efficiently handling speculative execution is shown. For purposes of discussion, the steps in this embodiment (as well as for FIG. 5) are shown in sequential order. However, in other embodiments some steps may occur in a different order than shown, some steps may be performed concurrently, some steps may be combined with other steps, and some steps may be absent.

An oldest instruction of non-dispatched control transfer instructions, such as conditional branch instructions and indirect jump instructions, and unresolved system instructions is determined (block 402). In some embodiments, control logic within a mapping unit in a processor determines this oldest instruction. A first pointer for this oldest instruction is determined (block 404). In some embodiments, the first pointer is a group number or group identifier sent with information corresponding to a respective instruction throughout a processor pipeline. In an embodiment, the first pointer is used to identify a particular instruction of outstanding instructions in the processor pipeline. In an embodiment, the first pointer also indicates program order age. In another embodiment, another field within the information corresponding to an instruction is sent throughout the processor pipeline which indicates program order age. Therefore, the first pointer or another field is used for comparisons to determine an older instruction between two instructions.

The first pointer is sent from a mapping unit to a load store unit (LSU) in a processor (block 406). An oldest unresolved issued control transfer instruction, such as a conditional branch instructions and an indirect jump instruction, is determined (block 408). In some embodiments, control logic within an execution unit in a processor determines this oldest instruction. A second pointer for this oldest instruction is determined (block 410). The second pointer is sent from the execution unit to the LSU in the processor (block 412). Since the execution unit sends the second pointer to the LSU, rather than send the second pointer to the mapping unit located multiple prior pipeline stages away from the execution unit, the latency for determining whether a given store instruction remains speculative is appreciably reduced. Additionally, there is no routing through multiple pipeline stages of any results from the mapping unit to the LSU for further comparisons. Accordingly, the latency is further reduced.

Figure 5:
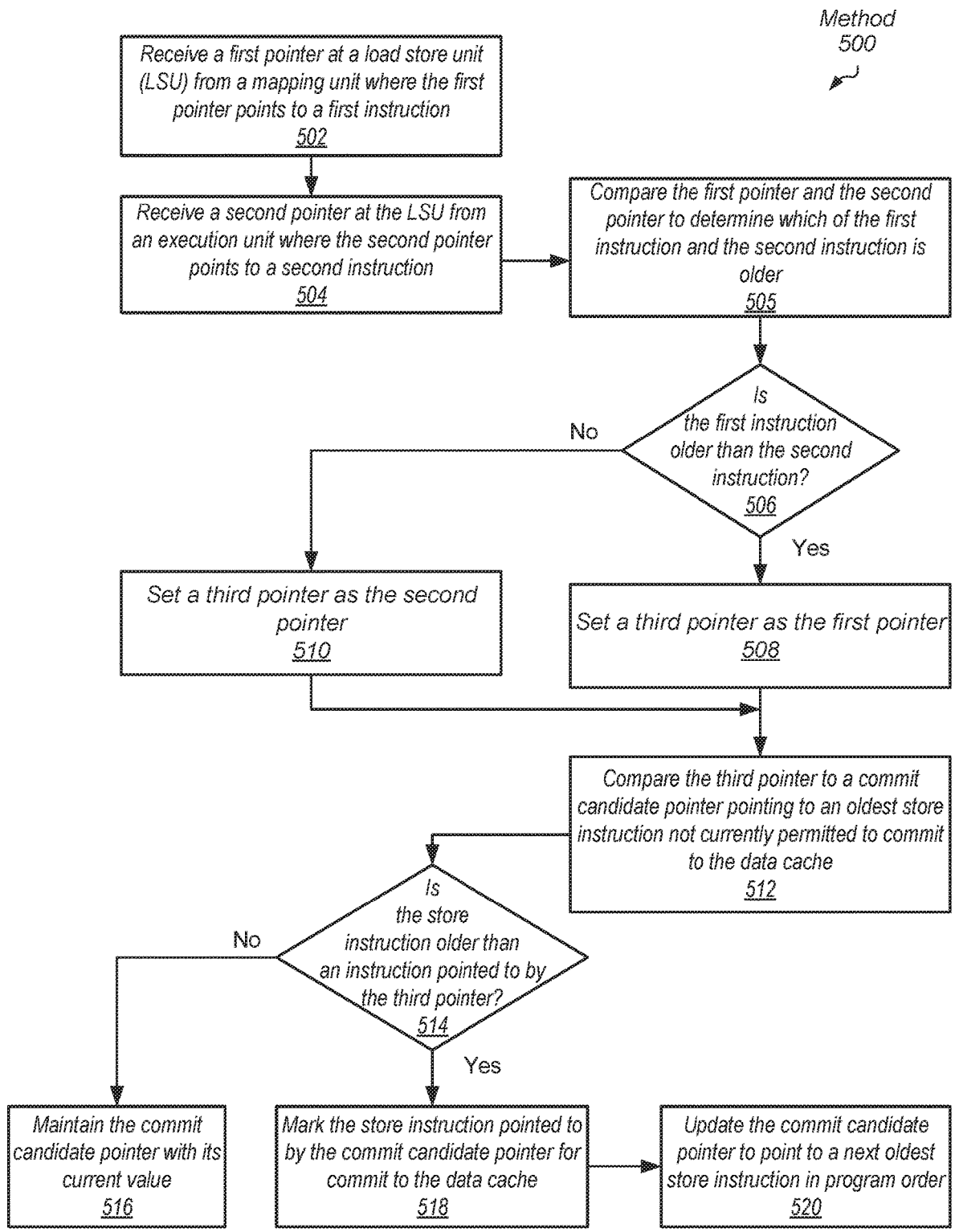
FIG. 5 is a flow diagram of one embodiment of a method for efficiently handling speculative execution.

Referring now to FIG. 5, a generalized flow diagram of one embodiment of a method 500 for efficiently handling speculative execution is shown. A first pointer is received at a load store unit (LSU) from a mapping unit (block 502). The first pointer points to a first instruction. In various embodiments, the first instruction is an oldest instruction of non-dispatched control transfer instructions, such as conditional branch instructions and indirect jump instructions, and unresolved system instructions. A second pointer is received at the LSU from an execution unit (block 504). The second pointer points to a second instruction. In various embodiments, the second instruction is an oldest unresolved issued control transfer instruction, such as a conditional branch instructions and an indirect jump instruction.

In an embodiment, the first pointer and the second pointer are compared to determine which of the first instruction and the second instruction is older (block 505). As described earlier, in some embodiments, pointers are assigned as group numbers in an ascending order to instructions in program order. Therefore, the smaller the group number, the older the instruction pointed to (or identified by) the pointer. In other embodiments, another field within the information corresponding to an instruction is sent throughout the processor pipeline which indicates program order age. Therefore, in an embodiment, the other field indicating program order age of an instruction is identified by a pointer, and this field is used for comparisons to the field of another instruction identified by another pointer to determine an older instruction between two instructions.

If the first instruction is older than the second instruction ("yes" branch of the conditional block 506), then a third pointer is set as the first pointer (block 508). However, if the first instruction is not older than the second instruction ("no" branch of the conditional block 506), then a third pointer is set as the second pointer (block 510). The third pointer is compared to a commit candidate pointer pointing to an oldest store not currently permitted to commit to the data cache (block 512). As described earlier, in some embodiments, the pointer are compared, whereas, in other embodiments, a field storing a program order age is identified by the pointers and compared.

If the store instruction pointed to by the commit candidate pointer is not older than an instruction pointed to by the third pointer ("no" branch of the conditional block 514), then the commit candidate pointer is maintained with its current value (block 516). A write access instruction (store instruction) pointed to by the commit candidate pointer remains speculative and is prevented from committing to the memory subsystem. If the store instruction pointed to by the commit candidate pointer is older than an instruction pointed to by the third pointer ("yes" branch of the conditional block 514), then the store instruction pointed to by the commit candidate pointer is marked for commit to the memory subsystem such as the data cache (block 518). The commit candidate pointer is updated to point to a next oldest store instruction in program order (block 520). In some embodiments, updating the commit candidate pointer also marks the store instruction for commit to the data cache.

Figure 6:
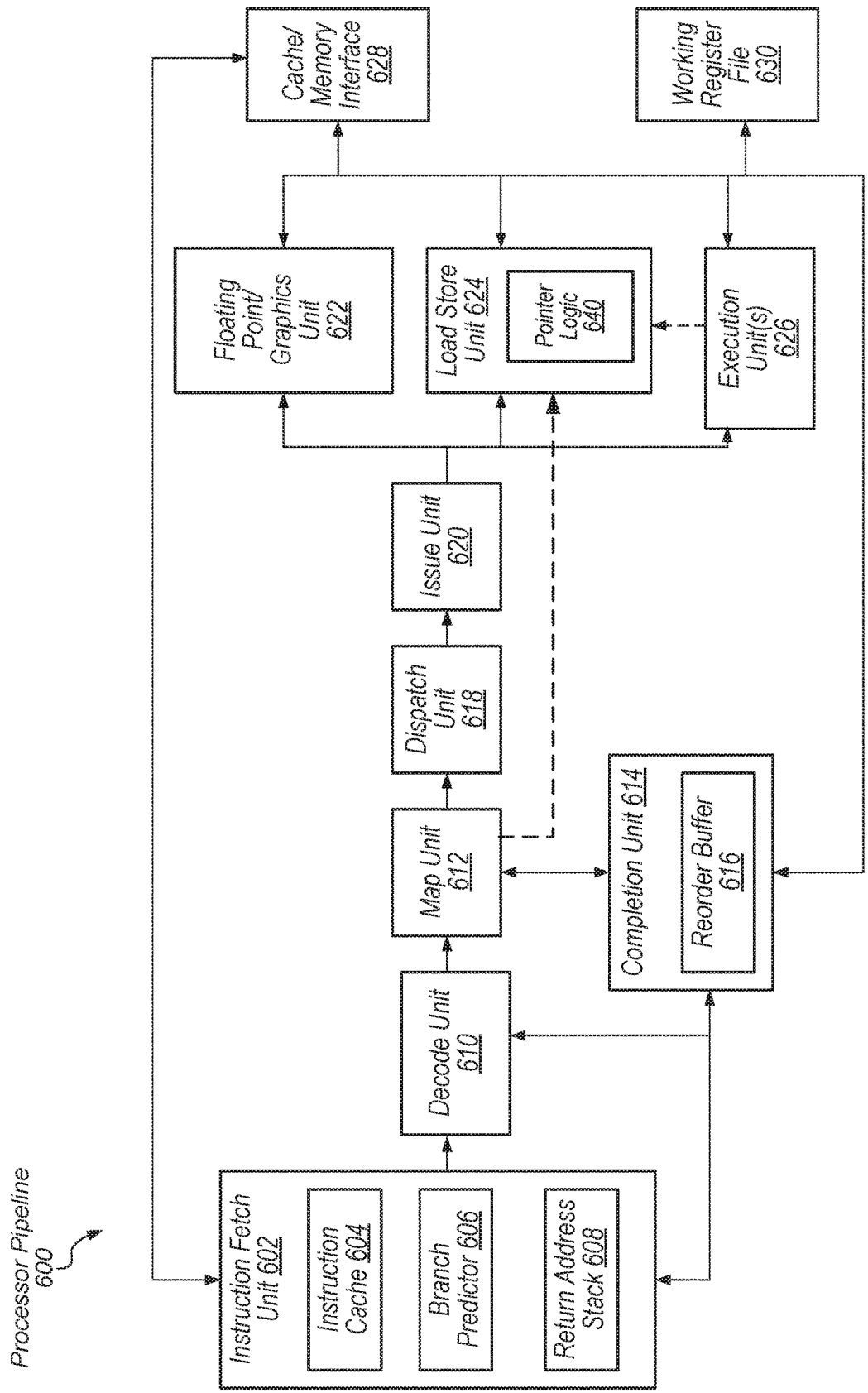
FIG. 6 is a block diagram of one embodiment of a processor pipeline.

Turning now to FIG. 6, a block diagram illustrating one embodiment of a pipeline of a processor 600 is shown. In various embodiments, the logic of processor 600 may be included in one or more of cores of a central processing unit (CPU). Processor 600 includes instruction fetch unit (IFU) 602 which includes an instruction cache 604, a branch predictor 606 and a return address stack (RAS) 608. IFU 602 may also include a number of data structures in addition to those shown such as an instruction translation lookaside buffer (ITLB), instruction buffers, and/or other structures configured to store state that is relevant to thread selection and processing (in multi-threaded embodiments of processor 600).

IFU 602 is coupled to an instruction processing pipeline that begins with a decode unit 610 and proceeds in turn through a map unit 612, a dispatch unit 618, and issue unit 620. Issue unit 620 is coupled to issue instructions to any of a number of instruction execution resources including execution unit(s) 626, a load store unit (LSU) 624, and/or a floating-point/graphics unit (FGU) 622. The execution unit(s) 626 use an authenticator 660 for generating and checking signatures based on at least a portion of a return address used for a procedure return.

The instruction execution resources 622-626 are coupled to a working register file 630. Additionally, LSU 624 is coupled to cache/memory interface 628. As shown, LSU 624 includes pointer logic 640 for comparing and updating pointers. As described earlier, in some embodiments, pointer logic 640 receives a first pointer from map unit 612, and the first pointer points to an oldest instruction of non-dispatched control transfer instructions, such as conditional branch instructions and indirect jump instructions, and unresolved system instructions. Pointer logic 640 also receives a second pointer from execution unit(s) 626, and the second pointer points to an oldest unresolved issued control transfer instruction such as a conditional branch instructions and an indirect jump instruction.

In some embodiments, one or more of the first pointer and the second pointer are received on direct sideband routes indicated by the dashed arrows. In other embodiments, existing paths are used for sending one or more of the first pointer and the second pointer to pointer logic 640 in LSU 624. In an embodiment, pointer logic 640 maintains a commit candidate pointer pointing to a given store instruction where the given store instruction is an oldest store instruction that is not currently permitted to commit to an external data cache via cache interface 628. In some embodiments, the given store instruction is stored in the store queue of LSU 624. When pointer logic 640 determines the commit candidate pointer is older than each of the first pointer and the second pointer, pointer logic 640 updates the commit candidate pointer to point to an oldest store instruction younger than the given store instruction stored in the store queue. The given store instruction is determined to no longer be speculative and it is permitted to commit to the data cache.

Reorder buffer 616 is coupled to IFU 602, decode unit 610, working register file 630, and the outputs of any number of instruction execution resources. It is noted that the illustrated embodiment is merely one example of how processor 600 is implemented. In other embodiments, processor 600 includes other components and interfaces not shown in FIG. 6. Alternative configurations and variations are possible and contemplated. In one embodiment, IFU 602 is configured to fetch instructions from instruction cache 604 and buffer them for downstream processing. The IFU 602 also requests data from a cache or memory through cache/memory interface 628 in response to instruction cache misses, and predict the direction and target of control transfer instructions (e.g., branches).

The instructions that are fetched by IFU 602 in a given clock cycle are referred to as a fetch group, with the fetch group including any number of instructions, depending on the embodiment. The branch predictor 606 uses one or more branch prediction tables and mechanisms for determining a next fetch program counter sooner than the branch target address is resolved. In various embodiments, the predicted address is verified later in the pipeline by comparison to an address computed by the execution unit(s) 626. For the RAS 608, the predicted return address is verified when a return address (branch target address) is retrieved from a copy of the memory stack stored in the data cache via the LSU 624 and the cache interface 628.

In various embodiments, predictions occur at the granularity of fetch groups (which include multiple instructions). In other embodiments, predictions occur at the granularity of individual instructions. In the case of a misprediction, the front-end of pipeline stages of processor 600 are flushed and fetches are restarted at the new address.

IFU 602 conveys fetched instruction data to decode unit 610. In one embodiment, decode unit 610 is configured to prepare fetched instructions for further processing. Decode unit 610 identifies the particular nature of an instruction (e.g., as specified by its opcode) and determines the source and destination registers encoded in an instruction, if any. Map unit 612 maps the decoded instructions (or uops) to physical registers within processor 600. Map unit 612 also implements register renaming to map source register addresses from the uops to the source operand numbers identifying the renamed source registers. Dispatch unit 618 dispatches uops to reservation stations (not shown) within the various execution units.

Issue unit 620 sends instruction sources and data to the various execution units for picked (i.e., scheduled or dispatched) instructions. In one embodiment, issue unit 620 reads source operands from the appropriate source, which varies depending upon the state of the pipeline. For example, if a source operand depends on a prior instruction that is still in the execution pipeline, the operand is bypassed directly from the appropriate execution unit result bus. Results are also sourced from register files representing architectural (i.e., user-visible) as well as non-architectural state. In the illustrated embodiment, processor 600 includes a working register file 630 that stores instruction results (e.g., integer results, floating-point results, and/or condition signature results) that have not yet been committed to architectural state, and which serve as the source for certain operands. The various execution units also maintain architectural integer, floating-point, and condition signature state from which operands may be sourced.

Instructions issued from issue unit 620 proceed to one or more of the illustrated execution units to be performed. In one embodiment, each of execution unit(s) 626 is similarly or identically configured to perform certain integer-type instructions defined in the implemented ISA, such as arithmetic, logical, and shift instructions. In some embodiments, architectural and non-architectural register files are physically implemented within or near execution unit(s) 626. It is contemplated that in some embodiments, processor 600 includes any number of integer execution units, and the execution units may or may not be symmetric in functionality.

Load store unit (LSU) 624 processes data memory references, such as integer and floating-point load and store instructions and other types of memory reference instructions. In an embodiment, LSU 624 includes a data cache (not shown) as well as logic configured to detect data cache misses and to responsively request data from a cache or memory through cache/memory interface 628. In one embodiment, a data cache in LSU 624 is configured as a set-associative, write-through cache in which all stores are written to a higher-level (e.g., L2) cache regardless of whether they hit in the data cache.

In various embodiments, LSU 624 implements a variety of structures configured to facilitate memory operations. For example, in some embodiments, LSU 624 includes components of LSU 300 (of FIG. 3). In some embodiments, LSU 624 also includes hardware for supporting atomic load-store instructions, memory-related exception detection, and read and write access to special-purpose registers (e.g., control registers). Floating-point/graphics unit (FGU) 622 performs and provide results for certain floating-point and graphics-oriented instructions defined in the implemented ISA. For example, in one embodiment FGU 622 implements single-precision and double-precision floating-point arithmetic instructions compliant with the IEEE floating-point standards, such as add, subtract, multiply, divide, and certain transcendental functions.

In the illustrated embodiment, completion unit 614 includes reorder buffer (ROB) 616 and coordinates transfer of speculative results into the architectural state of processor 600. Entries in ROB 616 are allocated in program order. Completion unit 614 includes other elements for handling completion/retirement of instructions and/or storing history including register values, etc. In some embodiments, speculative results of instructions are stored in ROB 616 before being committed to the architectural state of processor 600, and confirmed results are committed in program order. Entries in ROB 616 are marked as completed when their results are allowed to be written to the architectural state. Completion unit 614 also coordinates instruction flushing and/or replaying of instructions.

Figure 7:
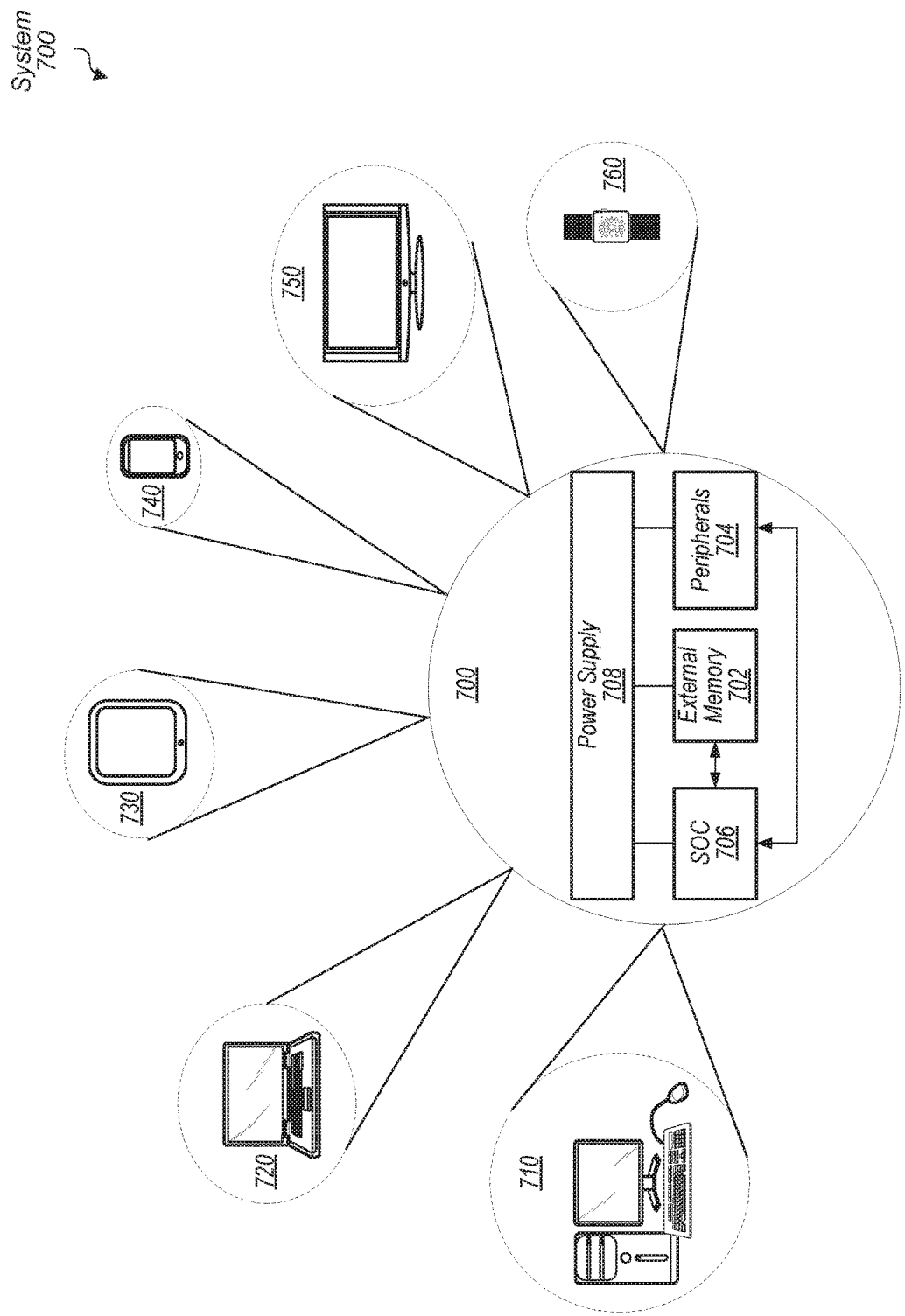
FIG. 7 is a block diagram of one embodiment of a system.

Turning next to FIG. 7, a block diagram of one embodiment of a system 700 is shown. As shown, system 700 represents chip, circuitry, components, etc., of a desktop computer 710, laptop computer 720, tablet computer 730, cell or mobile phone 740, television 750 (or set top box coupled to a television), wrist watch or other wearable item 760, or otherwise. Other devices are possible and are contemplated. In the illustrated embodiment, the system 700 includes at least one instance of a system on chip (SoC) 706 which includes multiple types of processing units, such as a central processing unit (CPU), a graphics processing unit (GPU), or other, a communication fabric, and interfaces to memories and input/output devices. In some embodiments, one or more processors in SoC 706 includes a processor pipeline similar to processor pipeline 600 (of FIG. 6) and a load store unit (LSU) similar to LSU 300 (of FIG. 3). In various embodiments, SoC 706 is coupled to external memory 702, peripherals 704, and power supply 708.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer). In some embodiments, more than one instance of SoC 706 is included (and more than one external memory 702 is included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAIVIBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
    a store queue configured to store outstanding store instructions; and
    control logic configured to:
        store a commit candidate pointer that identifies a given store instruction stored in the store queue;
        receive a first pointer from an external mapping unit, wherein the first pointer identifies a first outstanding instruction in a processor pipeline;
        receive a second pointer from an external execution unit configured to execute instructions, wherein the second pointer identifies a second outstanding instruction in the processor pipeline;
        compare each of the first pointer, the second pointer and the commit candidate pointer to determine an oldest instruction of the first instruction, the second instruction and the given store instruction; and
        in response to determining the given store instruction is the oldest instruction, update the commit candidate pointer to identify an oldest store instruction that is younger than the given store instruction.

2. The apparatus as recited in claim 1, wherein the given store instruction is an oldest store instruction not currently permitted to commit to an external data cache.

3. The apparatus as recited in claim 2, wherein the given store instruction is in a speculative path of an older branch instruction.

4. The apparatus as recited in claim 2, wherein the control logic is configured to mark the given store instruction for commit to the data cache.

5. The apparatus as recited in claim 1, wherein the first instruction is an oldest instruction of non-dispatched branches and unresolved system instructions.

6. The apparatus as recited in claim 1, wherein the second instruction is an oldest unresolved issued branch instruction.

7. The apparatus as recited in claim 1, wherein in response to determining the given store instruction is not the oldest instruction, the control logic is configured to maintain the commit candidate pointer with its current value.

8. The apparatus as recited in claim 7, wherein the control logic is configured to continue preventing the given store instruction from committing to the data cache.

9. A method, comprising:
    storing outstanding store instructions in a store queue;
    storing, by control logic, a commit candidate pointer that identifies a given store instruction stored in the store queue;
    receiving, by the control logic, a first pointer from an external mapping unit, wherein the first pointer identifies a first outstanding instruction in a processor pipeline;
    receiving, by the control logic, a second pointer from an external execution unit configured to execute instructions, wherein the second pointer identifies a second outstanding instruction in the processor pipeline;
    comparing, by the control logic, each of the first pointer, the second pointer and the commit candidate pointer to determine an oldest instruction of the first instruction, the second instruction and the given store instruction; and
    in response to determining the given store instruction is the oldest instruction, updating, by the control logic, the commit candidate pointer to identify an oldest store instruction younger than the given store instruction stored in the store queue.

10. The method as recited in claim 9, wherein the given store instruction is an oldest store instruction not currently permitted to commit to an external data cache.

11. The method as recited in claim 10, wherein the given store instruction is in a speculative path of an older branch instruction.

12. The method as recited in claim 10, further comprising marking the given store instruction for commit to the data cache.

13. The method as recited in claim 9, wherein the first instruction is an oldest instruction of non-dispatched branches and unresolved system instructions.

14. The method as recited in claim 9, wherein the second instruction is an oldest unresolved issued branch instruction.

15. The method as recited in claim 9, wherein in response to determining the given store instruction is not the oldest instruction, the method further comprises maintaining the commit candidate pointer with its current value.

16. A non-transitory computer readable storage medium storing program instructions, wherein the program instructions are executable by a processor to:
  store outstanding store instructions in a store queue;
  store a commit candidate pointer that identifies a given store instruction stored in the store queue;
  receive a first pointer from an external mapping unit, wherein the first pointer identifies a first outstanding instruction in a processor pipeline;
  receive a second pointer from an external execution unit configured to execute instructions, wherein the second pointer identifies a second outstanding instruction in the processor pipeline; and
  compare each of the first pointer, the second pointer and the commit candidate pointer to determine an oldest instruction of the first instruction, the second instruction and the given store instruction; and
  in response to determining the given store instruction is the oldest instruction, update the commit candidate pointer to identify an oldest store instruction younger than the given store instruction stored in the store queue.

17. The non-transitory computer readable storage medium as recited in claim 16, wherein the given store instruction is an oldest store instruction not currently permitted to commit to an external data cache.

18. The non-transitory computer readable storage medium as recited in claim 16, wherein the given store instruction is in a speculative path of an older branch instruction.

19. The non-transitory computer readable storage medium as recited in claim 16, wherein the first instruction is an oldest instruction of non-dispatched branches and unresolved system instructions.

20. The non-transitory computer readable storage medium as recited in claim 16, wherein the second instruction is an oldest unresolved issued branch instruction.

* * * * *